United States Patent [19]

Hirsch

[11] Patent Number: 4,751,997
[45] Date of Patent: Jun. 21, 1988

[54] PAD TURNER AND INVERTER

[75] Inventor: John L. Hirsch, Sheboygan Falls, Wis.

[73] Assignee: Curt G. Joa, Inc., Sheboygan Falls, Wis.

[21] Appl. No.: 87,385

[22] Filed: Aug. 20, 1987

[51] Int. Cl.⁴ .............................................. B65G 47/24
[52] U.S. Cl. .................................... 198/407; 198/408
[58] Field of Search ............... 198/377, 408, 410, 407, 198/406, 404

[56] References Cited

U.S. PATENT DOCUMENTS 2,141,460 12/1938 Brown et al. .................. 198/408 X
2,848,213 8/1958 Bloom et al. .................. 198/377 X
2,941,655 6/1960 Wells .................................. 198/408

Primary Examiner—Robert J. Spar
Assistant Examiner—D. Glenn Dayoan
Attorney, Agent, or Firm—Fuller, Puerner & Hohenfeldt

[57] ABSTRACT

Oblong articles such as sanitary pads moving in the direction of their length dimension are deposited on article carriers at the lower level of an ascending run of an input closed loop chain conveyor with corresponding one sides of the articles facing up. There are means for pivoting the carriers laterally at the upper level of the run to initiate turning of the articles about the line along which they are being conveyed. They turn 90° by the time they land on the paddles or carriers of an adjacent output conveyor which has a run descending from said upper level to a lower level so the articles which have been turned are also inverted when they complete their descent.

5 Claims, 3 Drawing Sheets

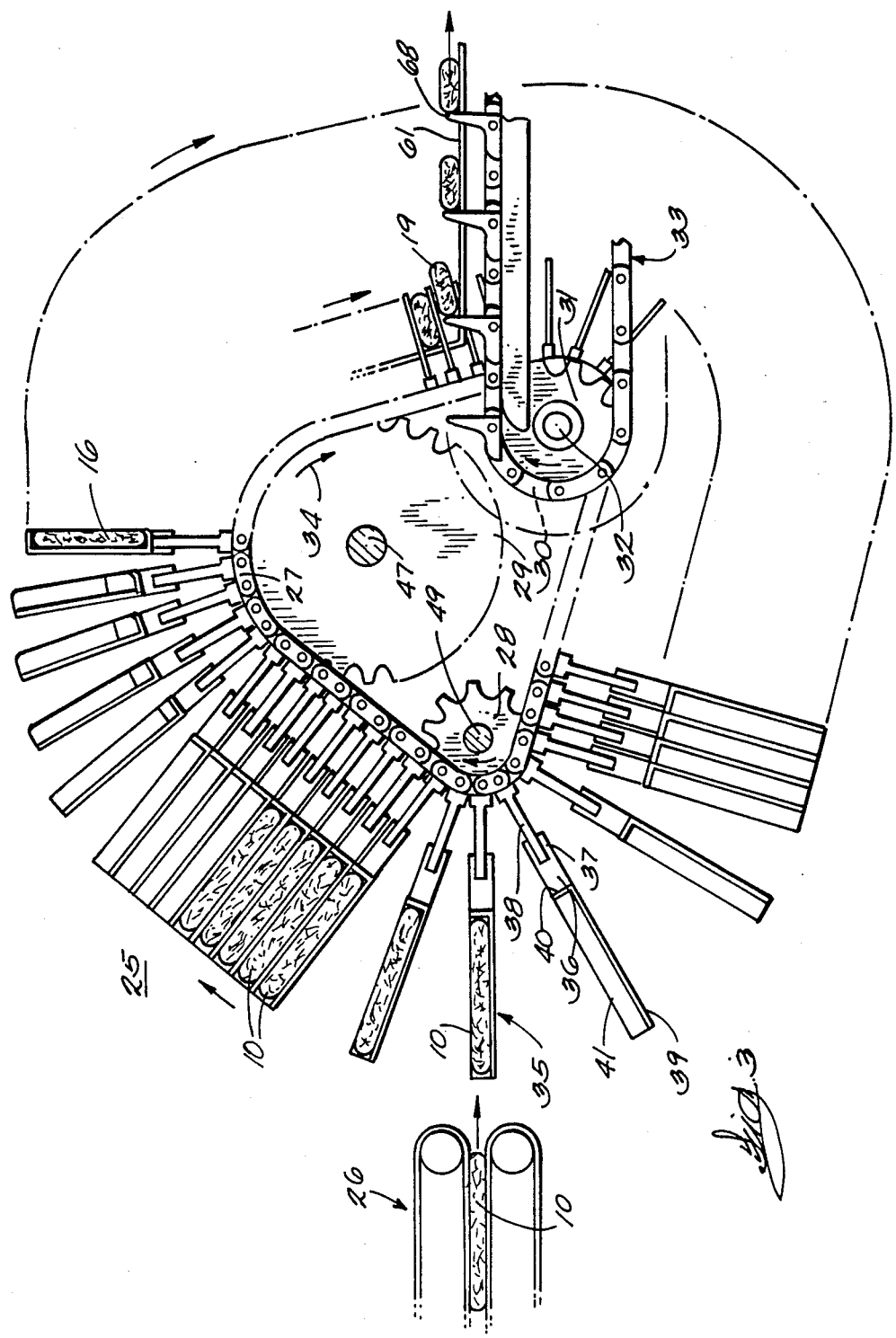

PAD TURNER AND INVERTER

BACKGROUND OF THE INVENTION

The invention disclosed herein is a machine for rotating and inverting articles such as female sanitary pads, as they advance along a production line. Sanitary pads are the articles which will be used to demonstrate the structure and function of the new machine but it should be understood that the machine can be used to rotate and invert other articles, too.

Sanitary pads are typically oblong objects comprised of a core of fluid absorbent material encased in a sheath of fluid permeable material. When the pads are discharged from the output of the pad fabricating machine to a conveyor, they are moving lengthwise. The last operation is usually the application of stiff paper that is coated with a release material.

Before stacks of pads are pushed into cartons or bags in a packaging machine, it is common practice to fold them to form two or three layers and encapsulate them in individual packages. This allows the user to remove one wrapped pad at a time from the carton and carry it in a purse, for instance, for use when occasion arises. Prefolding results in the pad being shortened and made more compact to make it easier to carry in a relatively small purse.

A pad must be folded with the relatively stiff release material coated strip on the outside of the fold so it does not wrinkle. Folding machines are so designed that it is necessary to convey the pads to the input of the machine while their long dimension is transverse to the direction in which they are moving on the conveyor to facilitate folding. If the pads come out of the fabricating machine with the release strip on the top side and moving in their lengthwise direction, it is necessary to invert the pads and rotate them 90° before they are packaged individually. The machine described herein rotates the pads 90° and also inverts them in an uninterrupted sequence.

SUMMARY OF THE INVENTION

The new article turner and inverter is comprised of two paddle chain conveyors arranged next to each other and running in substantially parallel vertical planes. The input conveyor is comprised of conveyor chain loops to which article carriers in the form of paddles are pivotally connected. The chain loops have an ascending run and a descending run. The input conveyor is aligned with a flat belt type infeed conveyor which transports the articles, namely pads, to the input station of the turner and inverter. The pads or other oblong articles, oriented for moving along their length dimension, are deposited on successive paddles of the input conveyor. This conveyor elevates the paddles after they are each loaded with a pad and when the paddles ascend through a particular range, they are acted upon by means for tilting the paddles so they spill the pads consecutively between two output conveyor paddles that are at their highest elevation. When a pad is transferred from a paddle on the input conveyor to between paddles on the output conveyor, the pad will be standing on one of its long edges and the relatively stiff adhesive release strip will be presented toward the direction in which the pads are being conveyed and outputed from the output conveyor. From the topmost position of the paddles on the output conveyor, the paddles descend on the chain conveyor which brings about the inversion of the pads. When the pads attain full inversion, they land on a lug chain outfeed conveyor which transports them to a wrapping machine.

The paddles on the input conveyor are provided with guide elements for causing them to follow along a cam track which is so shaped and arranged that when a paddle ascends to a certain elevation it is deflected and pivoted so as to cause the pad on it to be spilled in the space between adjacent paddles on the output conveyor.

How the objectives discussed above and other more specific objectives of the invention are achieved will become apparent in the ensuing more detailed description illustrative embodiments of the invention which will now be set forth in reference to the drawings.

DESCRIPTION OF THE DRAWINGS

FIG. 2 is a rear elevational view of the machine;

FIG. 3 is a side elevational view of the input conveyor of the inverting and turning machine;

FIG. 4 is a side elevational view of the output conveyor which is adjacent the input conveyor in the machine.

DESCRIPTION OF A PREFERRED EMBODIMENT

Figure 1:
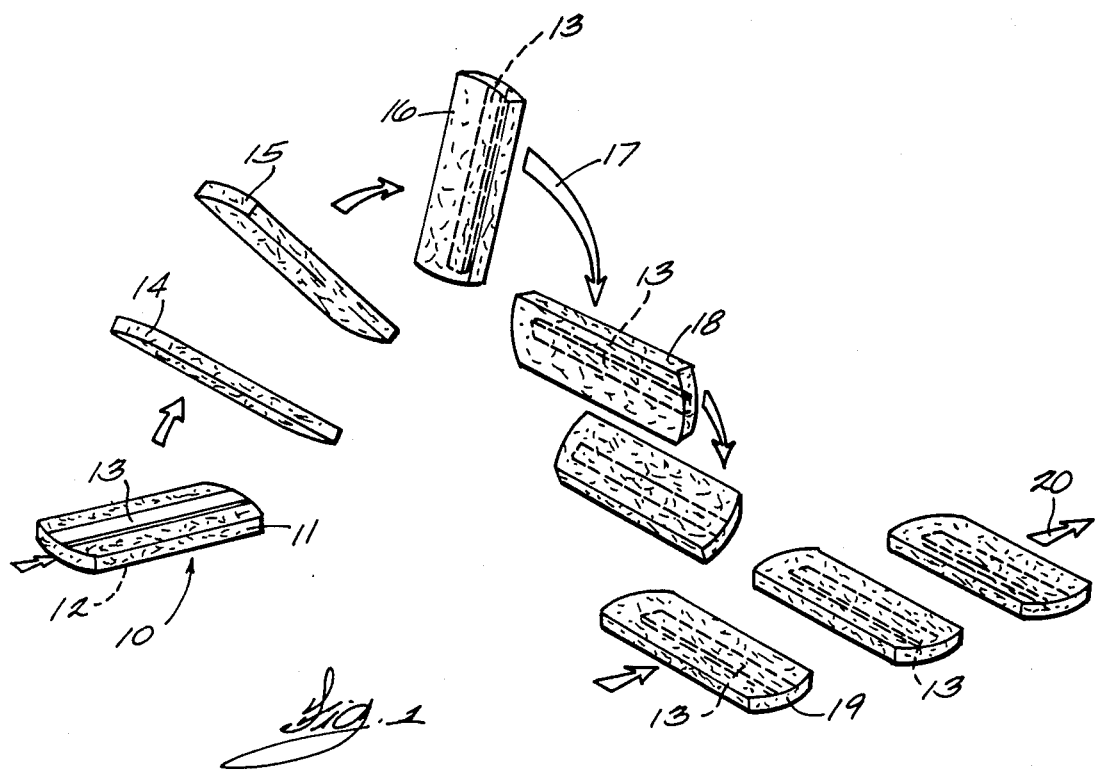
FIG. 1 is a diagram that illustrates the turning and rotating phases which each pad undergoes in the new pad inverting and turning machine.

The FIG. 1 diagram is illustrative of what is accomplished with the new combination article turner and inverter machine. An incoming article such as a completely fabricated pad is indicated generally by the numeral 10. Typical pad 10 comprises a soft body portion 11 which contains fluid absorbent material and is covered with a fluid permeable sheath at least on its bottom side 12. There is an adhesive release strip 13 tentatively adhered to the pad. Release strip 13 overlays a coating of pressure sensitive adhesive which is applied to the pad during the fabrication process. Strip 13 is usually a relatively stiff strip of paper that is coated with silicone or other suitable release material so it will peel freely off of the adhesive layer and not take off any of the adhesive material with it.

As will be explained, oblong pad 10 is deposited on article carriers such as paddles in the input conveyor of the machine and the pads ascend an incline through a range as demonstrated by pads 14 and 15 in FIG. 1. The pad in the position of the one marked 16 has its release strip 13 facing forward and the pad is standing on one of its ends at the time it reaches peak elevation in the machine. Pads within the arc beginning with pad 10 and ending with pad 16 are on an input paddle conveyor as will be explained in more detail later. When any pad reaches the position of pad 16, it is turned or rotated in the direction of the arrow 17 through an angle of substantially 90°. A pad marked 18 is where it would be at the moment it is received on the output conveyor. Its release strip 13 is still facing forwardly. The output coriveyor supports the pads on paddles and declines them until they reach the position of the pad marked 19.

At this time, the release strip 13 is on the bottom and oblong pad 19 is rotated 90° and inverted as compared with pad 10 which is just about to enter the input conveyor. Pad 19 and those ahead of it are moved linearly on another outfeed conveyor, not shown in FIG. 1, in the direction of the arrow 20. The pads are conveyed to a pad folding machine, not shown, where they are folded with the release strip 13 on the outside.

Figures 2, 4:
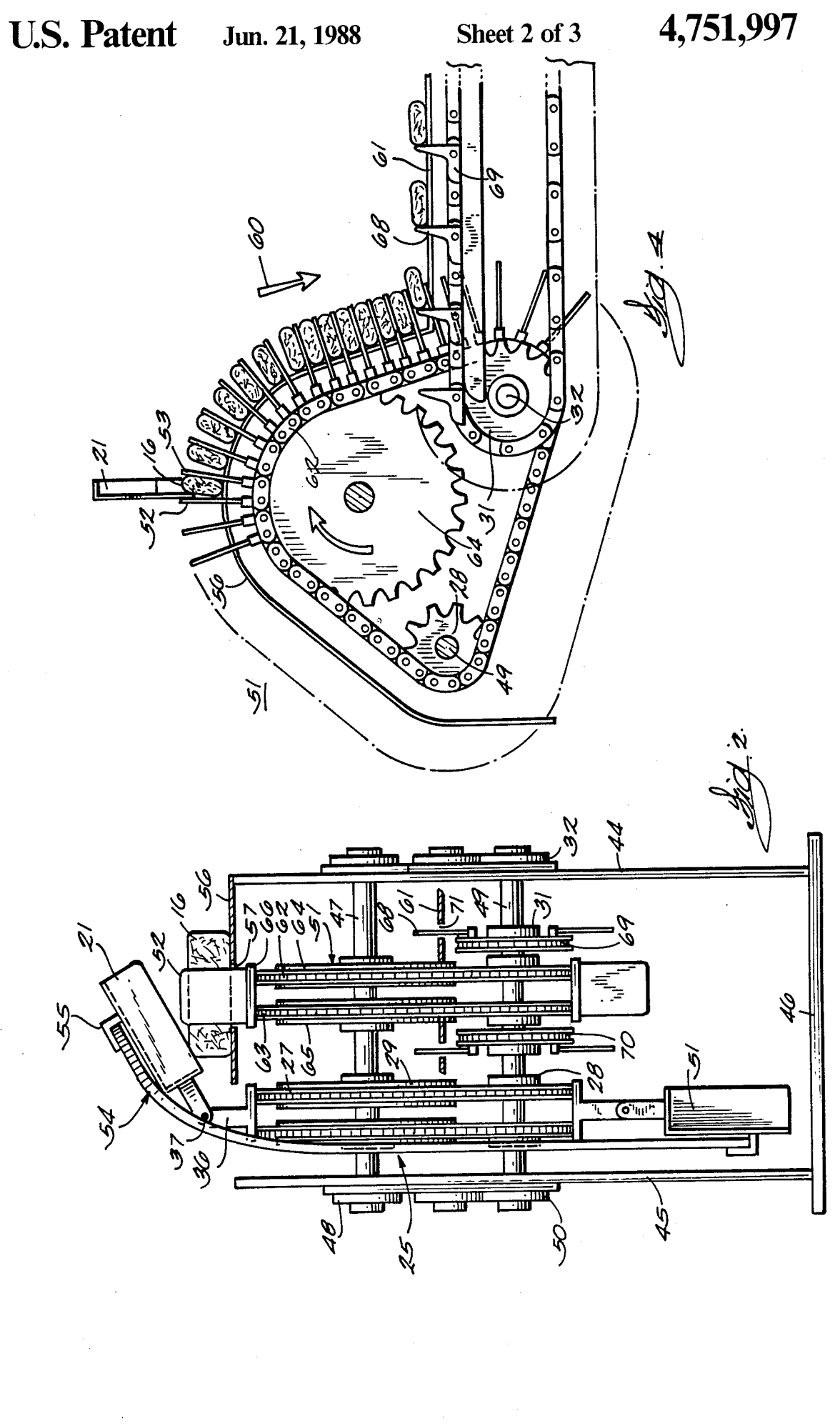

Refer now to FIGS. 2 and 3 for an explanation of the article turner and inverter machine. Consider FIG. 3 which is a side elevational view of the input conveyor which is indicated generally by the numeral 25. A pad about to enter input conveyor 25 is marked 10 as it was in FIG. 1. The pads are transported from the pad fabricating machine, not shown, on a conventional double belt infeed conveyor marked 26. The input conveyor 25 constituting part of the new machine is comprised of a pair of parallel running closed loop conveyor chains such as the one marked 27 in FIG. 3. Conveyor chains 27 run on sprockets two of which, 28 and 29, are visible in FIG. 3 and one of which, 30, is behind a sprocket 31 on a discharge conveyor chain 33 which will be discussed later. Sprockets 30 and 31 are both fastened to shaft 32. Any one of the sprockets can be driven rotationally to translate the conveyor chain 27 in the direction of the arrow 34 in FIG. 3.

As shown in FIG. 3, a plurality of article carriers in the form of paddles 35 have arms 36 that are pivotally connected at 37 to links 38. The links 38 are fastened to and are carried by conveyor chain 27. A typical paddle has a flat bottom 39, an end wall 40 and a rear wall 41 which means that one end and one side of the paddles are open. The paddle toward which the arrow from the reference numeral 35 points has just been loaded with a pad 10 from infeed conveyor 26. The oblong pads are moving in the direction of their long dimension on infeed conveyor 26 prior to the time they are inserted in the input conveyor 25 of the new machine.

As shown in FIG. 3, the pads ascend on the input conveyor and when they reach their maximum elevation they lie along a vertical radius of sprocket 29. The pad marked 16 in FIG. 3 corresponds to the pad similarly identified in FIG. 1. This pad reached maximum ascension and is in position for being turned 90° and transferred to the adjacent output conveyor as will be explained. Before doing so, attention is invited to FIG. 2 for a further description of the input conveyor 25.

The rear view of the machine in FIG. 2 shows how the input conveyor is arranged in the machine frame. The frame comprises two side plates 44 and 45 which are fastened to a base 46. The paralleled conveyor chains are marked 27 as they are in FIG. 3. These chains run on sprockets such as the one marked 29 and the sprockets are fixed to a driven shaft 47 which turns in bearings, such as the one marked 48, that are mounted to side plates 44 and 45. The lower sprockets 28 of the input conveyor are fastened to a shaft 49 which is journaled in bearings such as the one marked 50. The paddle at the top of FIG. 2 that is marked 21 has reached maximum elevation and is pivoted through an angle of almost 90° about the axis 37 as compared with any of the other paddles which are aligned with the conveyor chains 27. The lowermost paddle marked 51 in FIG. 2 is an example of one that is aligned with the chains. The pad 16 has already dropped off of upper paddle 21 and, as a result of its turning being completed by the force of gravity, pad 16 has been turned 90°. The output conveyor, generally designated 51, is adjacent the input conveyor 25. The pad in the position of the one marked 16 is dropped between two consecutive paddles of the output conveyor 51 the trailing paddle of which is marked 52 in FIGS. 2 and 4 and the leading paddle of which is marked 53 as shown in FIG. 4.

The paddles in the input and output conveyors 25 and 51, respectively always lie on a radius corresponding to the radius of curvature of the conveyor chains. The paddles are closest to each other when the conveyor chain section that supports them is ascending or descending and is straight and constitutes a tangent to any two consecutive sprockets. Consecutive paddles diverge substantially and are spread open when they run over a small diameter sprocket, such as sprocket 28. This facilitates depositing a pad on one paddle without interference by any paddles which precede or follow it on the conveyor chain.

Figure 5:
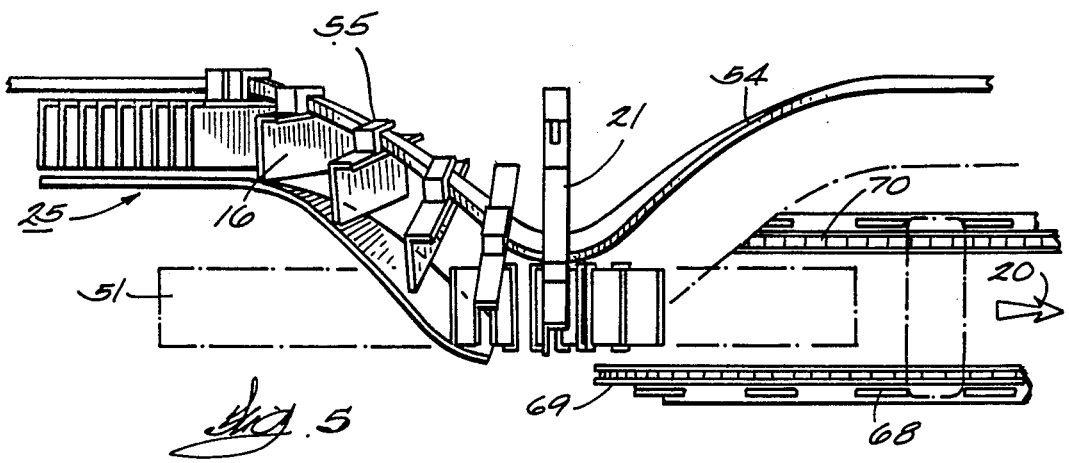
FIG. 5 is a plan view of part of the input conveyor which illustrates the manner in which a cam track manipulates the pad carrying paddles to bring about spilling of the pads at the proper position onto the adjacent output conveyor that carries out the inverting phase of the pads.

As is evident in FIGS. 2 and 5, the paddles of the input conveyor 25, such as paddle 21, are tilted to spill a pad onto the paddles of the output conveyor 51 by having the paddles guided by a cam bar 54 which is shown as a rear elevational view in FIG. 2 and as a plan view in FIG. 5. A side view of cam bar 54 is not shown, but if it is observed from the left side of FIG. 2, it would be apparent that the cam bar is a closed loop that is held in fixed position adjacent the conveyor chains. Each one of the paddles in the input conveyor 25 has an L-shaped follower bracket 55 fastened to it as is most apparent in FIGS. 2 and 5. The follower brackets slide on the cam bar 54 so the cam bar controls the lateral position of the paddles in the input conveyor. As the paddles approach their highest elevation in the input conveyor, the cam bar 54 deflects out of alignment with the conveyor as is evident in FIGS. 2 and 5 so that a paddle 21 will be compelled to pivot on its axis 37 to assume the maximum tilt angle in which it is depicted in FIG. 2. FIG. 5 shows how the cam bar 54 curves away from a vertical plane that is parallel to the chain conveyor toward the paddles on the output conveyor 51 which is symbolized by the dash-dot rectangle in FIG. 5. During most of their transit around the cam bar 54 loop, the paddles are extended radially outwardly and completely unpivoted.

The output conveyor profile is shown in FIG. 4. The pads stand on their side edges and are supported by a smooth sheet metal runner 56 which has a slot 57 through which the paddles 52 pass as the pads advance in the output conveyor. After the pads 16 are transferred from the input conveyor to between a pair of adjacent paddles such as those marked 52 and 53 on the output conveyor, the paddles continue to descend in the direction of the arrow marked 60. The pads land on a longitudinally slotted stationary support plate 61.

The output conveyor comprises similar parallel closed loop conveyor chains 62 and 63 which run on sprockets such as those marked 64 and 65 in FIG. 2. The sprockets are fastened to the same shaft 47 that supports sprockets 29 in the input conveyor. The paddles 52 of the output conveyor in FIG. 2 have bases 66 by which they are fastened to the conveyor chains 62.

Referring further to FIGS. 2 and 4, when the pads land on the support plate 61 of the horizontal outfeed conveyor, which is shown in section in FIG. 2, they are advanced by lugs 68 which are carried on a pair of outfeed conveyor chains 69 and 70. The lugs extend through slots 71 in the support plate 61 so they can push the pads along the conveyor as is evident in the right portion of FIG. 4. At this time, the pads are on their way to a folding machine, not shown, where they are folded and inserted in individual bags before they are put in cartons.

Although an embodiment of the new pad turning and inverting machine has been described in detail, such description is intended to be illustrative rather than limiting, for the concepts of the invention may be variously embodied. Hence, the scope of the invention is to be limited only by interpretation of the claims which follow.

I claim:

1. A machine for turning and inverting articles comprising:
   flexible closed loop input conveyor means having an inclined run extending from a low level to a higher level and a plurality of article carriers attached in succession to said conveyor means for moving toward said upper level along a predetermined line of movement from said lower level at which said articles are transferred to said carriers with one side of the article facing up,
   flexible closed loop output conveyor means having a declined run extending generally from said higher level to a lower level adjacent said input conveyor means and a plurality of article carriers attached in succession to said output conveyor means for moving from said higher level to a lower level,
   means for turning the carriers of said input conveyor means about said predetermined line of movement in succession when said carriers are proximate to said upper level so articles on the carriers of the input conveyor means transfer to carriers at said upper level on said output conveyor means for said articles to be carried down said declined run and arrive at said lower level of said output conveyor means with said one side of said articles facing down.

2. The machine according to claim 1 including:
   means for connecting said carriers to said flexible closed loop input conveyor means for pivoting transversely of said predetermined line of movement toward said adjacent output conveyor means,
   cam means proximate to the path along which said carrier means of said input conveyor means move and having a contoured portion in the region at which said articles are transferred to said output conveyor means corresponding to a predetermined degree of pivoting of said carrier means and said cam means having portions generally parallel to said predetermined line of movement, and
   cam followers on said carriers of said input conveyor means engaged with said cam means for compelling said carriers to pivot in a direction to cause said transfer to said output conveyor means when said followers run over said contoured portion and to cause said carriers to pivot in the opposite direction when said followers run on said generally parallel portions.

3. The machine according to claim 2 wherein said cam means is comprised of a bar adjacent said carriers and extends along the entire path through which said carriers are moved by said flexible closed loop input conveyor means.

4. The machine according to any one of claims 1, 2, or 3 including:
   elongated flat plate means at said low level of said output conveyor means onto which plate means said inverted articles descend, said plate means having longitudinally extending slots,
   flexible closed loop conveyor means having a run for translating longitudinally beneath and parallel to said plate means and, lug means fastened to said conveyor means and extending through said slots for engaging said articles when they descend to said low level and for pushing said articles off of said output conveyor carriers and along said plate means.

5. The apparatus according to any one of claims 1, 2, or 3 wherein:
   said flexible closed loop input and output conveyor means each comprise a pair of laterally spaced apart conveyor chains,
   laterally spaced apart pairs of coaxially rotatable sprockets on which said chain run, one of the pairs of similar sprockets of said input conveyor means having a relatively small diameter pair of lower sprockets rotatable about a laterally extending horizontal axis lying at said lower level and another pair of similar upper sprockets having diameters substantially larger than said one pair and rotatable about a horizontal axis that is parallel to and offset longitudinally and upwardly from the axis of said one pair so said chain in inclined, the carriers passing around the upper side of said upper sprockets spreading away from each other to facilitate said pivoting of the carriers and the carriers passing around said sprocket at the lower level spreading away from each other to facilitate depositing articles on said carriers,
   one of the pairs of similar upper sprockets of said output conveyor means having a diameter corresponding to said upper sprockets of said input conveyor, said pairs of upper sprockets being adjacent each other and rotatable coaxially,
   said output conveyor means including a pair of lower substantially smaller diameter sprockets and rotatable about a horizontal axis that is parallel to and offset downwardly and longitudinally of said upper sprockets so said chains are declined, the carriers on the chains passing around said upper side of said upper sprockets spreading away from each other to facilitate receiving said articles from said carriers of said input conveyor means.

* * * * *